Aug. 19, 1952 D. H. NEWHALL 2,607,128
GUN BORE MEASURING DEVICE
Filed Jan. 29, 1948 2 SHEETS—SHEET 1
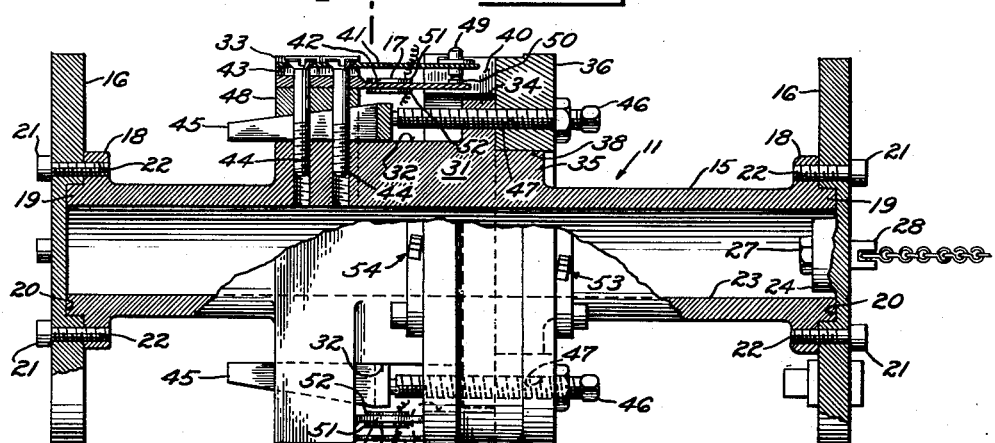
Fig. 1.
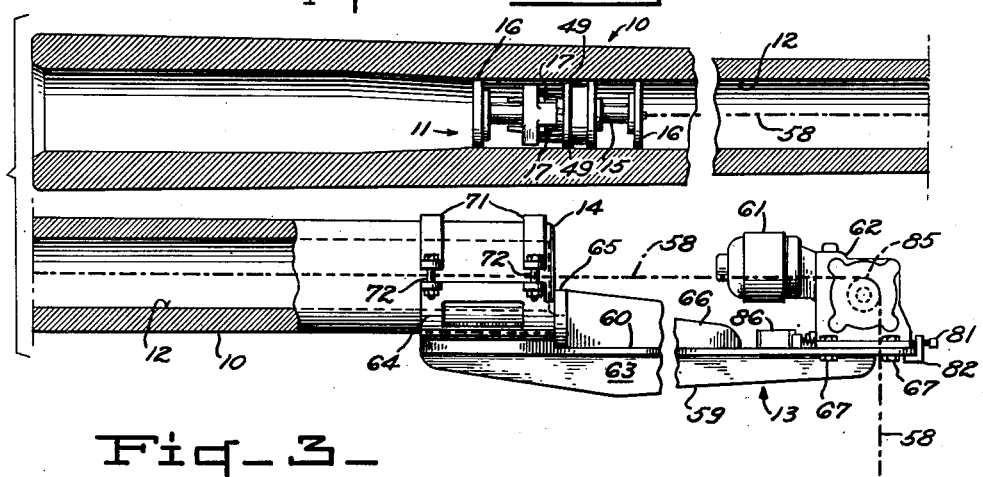
Fig. 2.
Fig. 3.
Inventor
Donald H. Newhall
By G. J. Kessenich + J. H. Church
Attorneys Aug. 19, 1952    D. H. NEWHALL    2,607,128
GUN BORE MEASURING DEVICE
Filed Jan. 29, 1948    2 SHEETS—SHEET 2
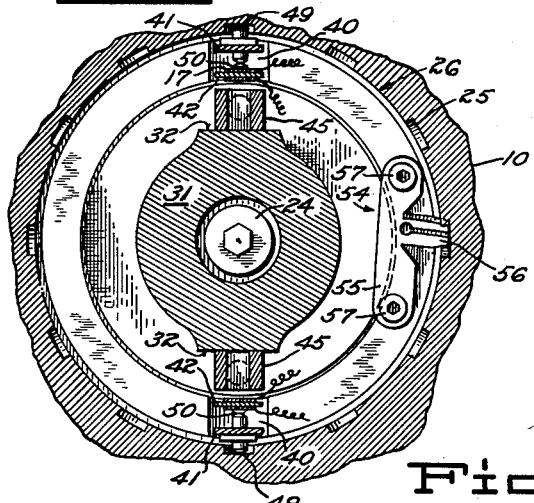
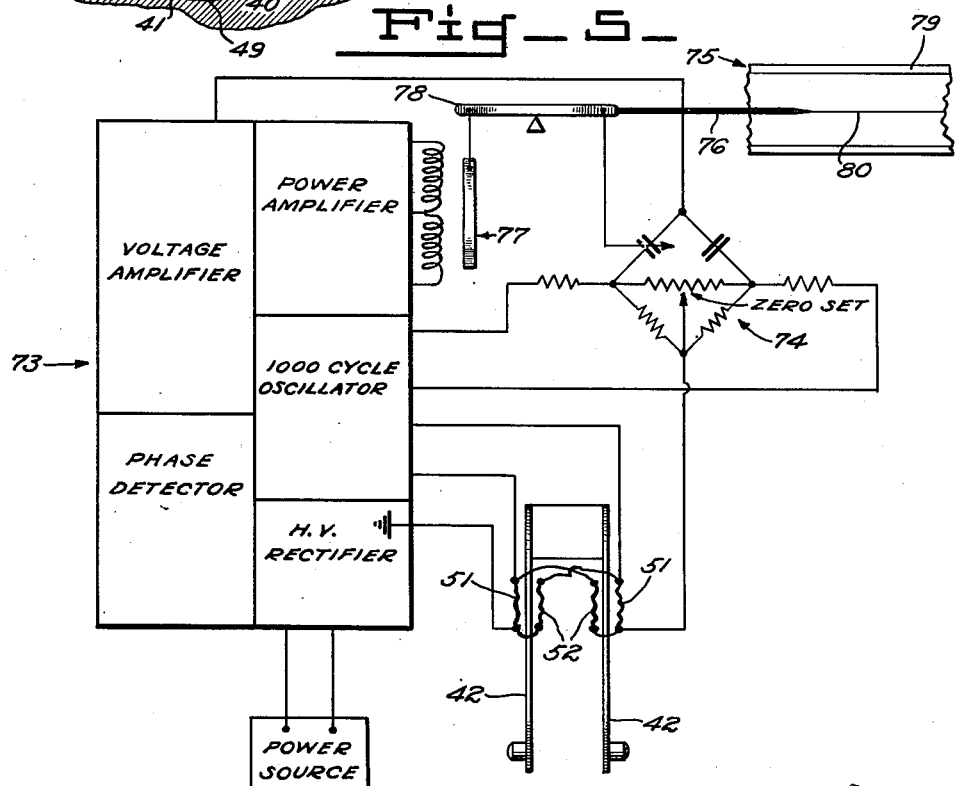
Inventor
Donald H. Newhall
By G. J. Kessenich + J. H. Church
Attorneys Patented Aug. 19, 1952

2,607,128

UNITED STATES PATENT OFFICE 2,607,128

GUN BORE MEASURING DEVICE

Donald H. Newhall, Walpole, Mass.

Application January 29, 1948, Serial No. 5,157

5 Claims. (Cl. 33—178)

(Granted under the act of March 3, 1883, as amended April 30, 1928; 370 O. G. 757)

The invention described herein may be manufactured and used by or for the Government for governmental purposes without the payment of any royalty thereon.

This invention relates to a device for measuring the bore diameter of gun tubes by the use of electric strain gages and an electrical recording device to automatically record the deviations of the bore diameter.

Measurement of bore diameters of firearm barrels has been done in the past by an instrument called a star gage. Such instrument was manipulated manually to expand an opposed pair of feeler arms which engaged corresponding opposed lands or grooves and the reading of the bore diameters was then visually noted and likewise manually recorded. In the case of small arms barrels such a procedure while tedious was not too arduous although quite slow. In the case of gun tubes of larger caliber, star gaging of such a tube by conventional measuring means was definitely a slow laborious procedure and at best only a comparatively small number of bore measurements could be taken in view of the great amount of time involved in taking more frequent measurements. Then too, the accuracy of the bore diameters as obtained by conventional methods was dependent entirely upon the skill of the person manipulating the gage.

Accordingly, it is an object of this invention to provide a device whereby the inside diameter of gun tubes can be rapidly and accurately measured.

Another object of this invention is to provide a device to automatically measure and record an infinite number of bore measurements.

Still another object of this invention is to provide a device for automatically measuring a plurality of lands and/or grooves simultaneously.

A further object of this invention is to provide a device for accurately and automatically measuring the deviation in the normal height of the land of a firearm barrel from the adjacent groove.

The specific nature of the invention as well as other objects and advantages thereof will clearly appear from a description of a preferred embodiment as shown in the accompanying drawings in which:

Fig. 1 is an enlarged longitudinal sectional view of the measuring head showing the arrangement of the strain gages therein.

Fig. 2 shows a longitudinal sectional view of a gun tube illustrating the general arrangement of the bore measuring device when measuring the bore diameter of gun tubes.

Fig. 3 is a fragmentary detail view of the base member of the driving mechanism showing the manner of slidably mounting such mechanism.

Fig. 4 is a cross sectional view taken along the line 4—4 of Fig. 1.

Fig. 5 is a schematic diagram of the wiring circuit utilized in the recording device in conjunction with the measuring head of this invention.

This invention essentially consists of utilizing electric strain members secured to cantilevered beams mounted in a measuring head which in turn is inserted in the bore of a gun tube. The change in resistance of each of such strain members, produced by flexing of the beams, is recorded on an electrical recording device. Such recording device, calibrated to read the bore diameter directly, produces a graph on which is automatically recorded an infinite number of measurements within the gun tube. The head containing the electric strain members is traversed through the bore of the gun tube by means of a motor driven traversing mechanism.

Accordingly, there is shown in Figs. 2 and 4 a gun tube 10 which is preferably supported in a horizontal position in any suitable fashion. Tube 10 is provided with a muzzle end 14, a bore 12 and within the bore 12 grooves 25 and lands 26 are provided. A measuring head 11 is adapted to be inserted in bore 12 of gun tube 10. A driving mechanism 13 is provided to traverse head 11 through bore 12 in a manner that will be later explained. Driving mechanism 13 is preferably mounted on muzzle end 14 of tube 10.

Measuring head 11 comprises a body portion 15, a pair of cylindrical bearing plates 16, one each of such plates being secured to opposite ends of body 15, and a pair of oppositely disposed strain gages 17 mounted in a manner to be later described. Body 15 is a substantially cylindrical member being provided with an axial hole 23 and on each end with an integral flange 18 and a forwardly projecting hub-like end 19. Each bearing plate 16 is provided with an axially disposed recess 20 which permits mounting thereof on hub 19. Plates 16 are secured to body portion 15 by screws 21 which engage suitable threaded holes 22 provided in flange 18. Right hand bearing plate 16, as shown in Fig. 1, is provided with an axially disposed integral boss 24 and a clevis 28 is rotatably secured to boss 24 by a nut 27.

Approximately in the center of body portion 15 there is provided an enlarged diameter portion 31 substantially cylindrical but provided with diametrically opposed milled flat surfaces 32. On the left end of each of the flat portions 32 there is provided an upstanding bifurcated lug 33. Adjacent the right end of enlarged portion 31 there is provided an integral flange 34 and adjacent flange 34 there is provided a hub 35 of substantially lesser diameter than flange 34.

A cylindrical bearing member 36 is mounted on hub 35, a cylindrical recess 37 being provided in the left face of such bearing member as shown in Fig. 1 to permit such bearing member to be placed adjacent flange 34. An axial hole 38 provided in bearing member 36 permits such bearing member to snugly fit on hub 35. A plurality of suitable screws secure bearing member 36 to flange 34.

It is obvious that bearing member 36 must be assembled to body portion 15 prior to assembling right hand bearing plate 16. It is also obvious that the bearing plates 16 and bearing member 36 have the same outside diameter and such diameter is of a size such as to permit the whole assembly to readily slide within the bore 12 of gun tube 10. A pair of opposed beam clearance slots 40 are provided in bearing member 36 which communicate with recess 37 as shown in Fig. 1 for a purpose to be presently described.

Strain gages 17 are mounted within the bifurcation provided by lugs 33. Each strain gage 17 comprises a pair of cantilever beams 41 and 42 placed one above the other and separated by a block 43. Beams 41 and 42 are secured to enlarged diameter portion 31 by screws 44. A longitudinally slidable wedge block 45 is actuated by a screw 46 threaded into a suitable hole 47 in bearing member 36. Such block is bifurcated in order to surround screws 44 so that the sloped surface of block 45 can engage a block 48 placed underneath cantilever beam 42 and cooperate with a corresponding slope on such block to raise or lower beams 41 and 42. The free ends of cantilever beams 41 and 42 project towards the right, as shown in Fig. 1 into slots 40.

A guide button 49 is secured to the free end of beam 41 and is provided to engage either a groove or land in bore 12. This will be explained in more detail later. A button 50 is provided on cantilever beam 42 opposite button 49 and engageable by button 49. On each side of beam 42, that is, on the upper and lower sides of such beam, there is provided an electrical strain member 51 and 52. Strain members 51 and 52 are connected to a self-balancing bridge 74 as shown in Fig. 5 and the function thereof will be later explained.

Buttons 49 are provided with a contact end of suitable shape to properly engage either the land or the groove of tube 10. In order to insure that button 49 will remain in engagement with the same groove or land in tube 10, guide keys 53 and 54 are provided on opposite faces of bearing member 36. Such keys comprise a plate member 55 having a projecting finger-like lug 56 thereon. Lug 56 is shaped to enter a groove provided in the bore 12 of tube 10 and such lug is preferably bifurcated to provide a spring-like action in order that lug 56 may be easily and readily accommodated by any possible constriction in the groove. Each guide key 53 and 54 is secured to guide member 36 by screws 57. Guide keys 53 and 54 are so aligned as to conform to the helix on which the groove in the bore has been cut. Thus guide keys 53 and 54 will follow along the groove in the bore and cause a corresponding rotation of head 11 thereby maintaining the outwardly projecting end of buttons 49 in intimate contact with either the groove or land as may be desired. The height or the distance from the center of head 11 to button 49 is readily adjusted by means of wedge 45. Such adjustment is provided to permit the button 49 to ride in the groove or on top of the land. As may be appreciated, there is a substantial difference between groove diameters and bore diameters so that such adjustment is necessary to avoid putting undue strain on the beams 41 and 42.

The outside beam 41 is provided to eliminate the friction load on beam 42 to which the strain members are attached. The friction load produced by dragging head 11 through bore 12 of gun tube 10 is taken up by the outside cantilever beam 41. Such beam flexes with any change in diameter and produces a corresponding flexing movement on beam 42. As beam 42 is flexed by the variations in the diameter of the bore, strain members 51 and 52 change in resistance in proportion to the deflection of such beams. In the preferred form of this invention, four such strain members are provided, two of which produce an increase in resistance while the other two produce a decrease in resistance as the beams are flexed.

Head 11 is arranged to be pulled through bore 12 of tube 10 by means of traversing mechanism 13 as will now be described. A bracket 59 is provided to support traversing mechanism 13. Bracket 59 comprises a base-like member 60 which is utilized to support a motor driven gear reduction unit 62. Unit 62 is driven by a synchronous electric motor 61, the purpose of which will be later described. A web 63 is provided on the underside of bracket 59 for stiffening purposes. On the left end of bracket 59 as shown in Fig. 2, there is provided a semi-cylindrical mounting member 64 which is adapted to surround one-half of the muzzle end 14 of tube 10. A stop plate 65 is welded to the front side of mounting member 64 as shown in Fig. 2 for a purpose to be later described. A web member 66 is provided on top of base 60 which is welded thereto and to plate 65 also for stiffening purposes.

A pair of clamps 71 are provided which are secured to mounting member 64 by means of bolts 72. Clamps 71 surround the top half of muzzle 14 and are provided to secure bracket 59 to muzzle 14. Gear reduction unit 62, with motor 61 attached thereto, is slidably mounted on the right end of base member 60 and is secured thereto by bolts 67. Bolts 67 are passed through slotted holes 68 in base member 60 to provide limited longitudinal movement of gear reduction unit 62. A pair of stop members 69 are provided on top of base member 60 and a spring 70 is placed between each stop member 69 and the base of gear reduction unit 62 to return such unit to its normal position as will be presently explained. The longitudinal position of gear reduction unit 62 on base member 60 may be adjusted by means of screws 81. Such screws are horizontally disposed in suitable lugs 82 secured to the right end of base member 60.

A limit switch 86 is secured to base member 60 adjacent the left hand edge of gear reduction unit 62. A contact plunger 83 projecting from limit switch 86 is arranged to contact a suitable stop 84 secured to gear reduction unit 62 when such unit is moved to the left as shown in Fig. 2 and as will be presently explained.

A sprocket 85 is secured in a conventional manner to gear reduction unit 62. Connection between measuring head 11 and gear reduction unit 62 is made by means of a chain 58. One end of such chain is secured to clevis 28 and the other end is placed in engagement with sprocket 85. Thus when sprocket 85 is rotated by means of motor driven gear reduction unit 62, the chain 58 is moved to the right as shown in Fig. 2 thereby pulling head 11 through bore 12 of tube 10. When the right hand bearing plate 16 strikes stop plate 65, the gear reduction unit 62 is forced to move to the left thereby depressing contact plunger 83 of limit switch 86 thus opening the circuit and stopping the motor 61 which in turn arrests the movement of sprocket 85 thereby stopping further traversing of measuring head 11 through bore 12.

Referring now to Fig. 5 there is shown therein a schematic diagram illustrating the circuit of a conventional automatic recording device utilized in conjunction with measuring head 11 above described. In this device the electrical signal picked up by the cantilever beam 42 is introduced to a conventional power unit 73 where such signal is amplified and then the amplified signal is referred to a self-balancing bridge circuit 74. A recording mechanism 75 is provided which comprises a pen 76, a solenoid motor 77, and a balance bar 78, one end of which is connected to bridge circuit 74 and the other end to motor 77. Unbalancing of bridge circuit 74 actuates solenoid motor 77 to effect movement of pen 76. A chart 79 is associated with pen 76 and is arranged to run under the pen 76 with a speed proportional to the traverse of measuring head 11. Such is accomplished by means of a motor drive (not shown) which is synchronized with motor 61. In the preferred form of this invention a length of two feet of chart 79 represents the profile of gun tube 10 from the breech to the muzzle which in this preferred embodiment is equivalent to 232 inches. A centerline 80 is provided on chart 79 and pen 76 is adjusted to rest on such line when button 49 is on the nominal diameteric dimension of the gun tube.

As the measuring head 11 is traversed through bore 12 of tube 10 by motor 61, any increase or decrease in the diameter of bore 12 flexes beams 42 due to the contact of buttons 49 with buttons 50 thereby changing the resistance of strain members 51 or 52 or both which produces an electrical signal and causes a displacement of pen 76 from the centerline 80 of chart 79 an amount proportional to the change in diameter recognized by cantilever beam 42. As measuring head 11 is traversed along the bore, guides 53 and 54 impart a rotary movement to head 11 in conformance to the helical lead of the grooves provided in bore 12 thereby keeping buttons 49 on the groove or land as the case may be.

It is thus apparent from the foregoing description that there is here provided a device to automatically measure and record an infinite number of interior bore diameter measurements which substantially eliminates all manual operation. Further, this invention provides a device wherein such measurements can be made with much greater rapidity and a vastly higher degree of accuracy than by any other known prior art. It is also desired to point out that this device can be used for the measurement of any interior bore or other opening where the sides are substantially parallel. The use of this invention can be readily broadened and yet lie within the scope of this invention to record the profile of any angularly shaped hollow member such as a flow nozzle or Pitot tube and the like. Likewise "out-of-roundness" of any cylindrical object can be readily recorded. Automatic recording of an average diameter is easily achieved by the use of a plurality of gages. In addition, multiple independent measurements of diameters at various angular positions with respect to the center of the tube may be simultaneously and automatically recorded.

It is further desired to point out that the arrangement shown herein is such that a relatively loose fit of measuring head 11 within bore 12 causes no error in the precision or accuracy of the measurement because of the fact that beams 41 and 42 are preloaded and therefore any deviation from the linear transverse movement of such head within tube 10 causes an increase in the deflection of one pair of beams and an equal decrease in the deflection of the other pair of beams, hence the balance of the electrical bridge remains constant except for changes in diameter. It is further apparent that substantial wear on the bearing portions of the measuring head can be tolerated as long as the beams are properly adjusted.

I claim:

1. In apparatus for measuring the increase or decrease in the bore diameter of a tube, the combination of a diametrically opposed pair of flexibly mounted strain gages, and a cantilever beam mounted in juxtaposition with each of said gages, said beam being also mounted so that the free end thereof simultaneously contacts the interior bore surface of the tube and the free end of said juxtaposed strain gage whereby the flexing movements of said beams produced by an increase or decrease in the bore diameter of the tube are correspondingly transferred to said strain gages for indicating the degree of flexure of said beams relative to the initial position thereof.

2. In apparatus adapted to be traversed through a tube for measuring the increase or decrease in the bore diameter thereof, the combination of a diametrically opposed pair of first cantilever beams, a strain element fixedly secured on either side of said first beams adjacent the area of flexure thereof, a second cantilever beam interposed between the interior bore surface of the tube and each of said first beams, and projecting means fixedly secured to the free ends of said second beams and arranged to simultaneously contact the interior bore surface of the tube and the free end of each of said first beams whereby the flexing movements of said second beams produced by increases and decreases in the bore diameter of the tube are directly transferred to said first beams and actuate said strain elements in accordance with the degree of radial movement of said projecting means to indicate the relative changes in the bore diameter of the tube.

3. In apparatus for measuring the changes in the bore diameter of gun barrels having a plurality of helical lands and grooves, the combination of a measuring head adapted for helical traverse through the gun barrel, a pair of first cantilever beams mounted on opposite sides of said measuring head, an electrical strain sensitive element fixedly secured to either side of each of said first beams adjacent the area of flexure thereof, a second cantilever beam interposed between the interior bore surface of the barrel and each of said first beams, a contact button projecting substantially at right angles from either side of the free end of each of said second beams, said first and second beams being equally preloaded whereby said contact button is maintained in simultaneous contact with the free end of said first beam and either a land or groove in the barrel despite changes in the bore diameter of the barrel, and means associated with said strain elements for continuously indicating the differences between the degree of flexing of each of said second beams for determining the relative increases and decreases in the diametrical distance between opposite lands or grooves in the barrel.

4. Apparatus for measuring the increases and decreases in the diametrical distance between an opposite pair of helically disposed lands in a rifled gun barrel comprising, in combination, a measuring head, means for helically traversing said head through the bore of the barrel in accordance with the helical path of the grooves formed by adjacent lands, a pair of electrical strain gages flexibly mounted on opposite sides of said measuring head, a cantilever beam mounted in said head in juxtaposition with each of said strain gages, means on the free end of each of said cantilever beams for transferring to said strain gages the degree of flexing produced by increases and decreases in the contour of the interior bore surface of the barrel, means for radially adjusting each combination of said cantilever beams and said strain gages in accordance with the predetermined land or groove to be measured and means for continuously indicating the relative electrical resistance produced in said strain gages by the flexing thereof for measuring the changes in the diametrical distance between opposed pairs of lands or grooves.

5. Apparatus for continuously measuring the increases and decreases in the diametrical distance between an opposite pair of helically disposed grooves in a rifled gun barrel, comprising in combination, a measuring head, a pair of first cantilever beams mounted on opposite sides of said measuring head, an electrical strain sensitive element fixedly secured to either side of each of said first beams adjacent the area of flexure thereof and arranged to vary in resistance according to the degree of flexing produced in said first beams, a second cantilever beam interposed between the interior bore surface of the barrel and each of said first beams, a contact button projecting substantially at right angles from either side of the free end of each of said second beams and normally arranged to protrude beyond the outer surface of said measuring head, said first and second beams being equally preloaded whereby said buttons are maintained in simultaneous contact with the bottom surface of the barrel groove and the free end of said first beam, means for traversing said measuring head through the barrel, means for imparting helical movement to said measuring head in correspondence to the helical path of the grooves in the barrel whereby said contact buttons are continuously engaged in opposite grooves, means for radially adjusting the degree of protrusion of said contact buttons from said measuring head, and means for continuously indicating the relative electrical resistance produced in said strain gages by the flexing thereof for measuring the increases and decreases in the diametrical distance between an opposed pair of gun barrel grooves.

DONALD H. NEWHALL.

REFERENCES CITED

The following references are of record in the file of this patent:

UNITED STATES PATENTS

| Number | Name | Date |
|---|---|---|
| 1,912,618 | Bryant | June 6, 1933 |
| 1,946,924 | Allen et al. | Feb. 13, 1934 |
| 2,099,896 | Kinzel | Nov. 23, 1937 |
| 2,208,635 | Johnson | July 23, 1940 |
| 2,219,708 | Kruse | Oct. 29, 1940 |
| 2,239,811 | Cuppers | Apr. 29, 1941 |
| 2,239,981 | Terry et al. | Apr. 29, 1941 |
| 2,316,975 | Ruge | Apr. 20, 1943 |
| 2,325,299 | Bench et al. | July 27, 1943 |
| 2,369,909 | Mestas | Feb. 20, 1945 |
| 2,439,595 | Cooke | Apr. 13, 1948 |
| 2,487,681 | Weisselberg | Nov. 8, 1949 |
| 2,495,797 | Whitlock et al. | Jan. 31, 1950 |
| 2,547,647 | Levesque | Apr. 3, 1951 |

FOREIGN PATENTS

| Number | Country | Date |
|---|---|---|
| 565,504 | Great Britain | Nov. 14, 1944 |

OTHER REFERENCES

Journal of Scientific Instruments, Nov. 1945, page 219.